Figure 1:
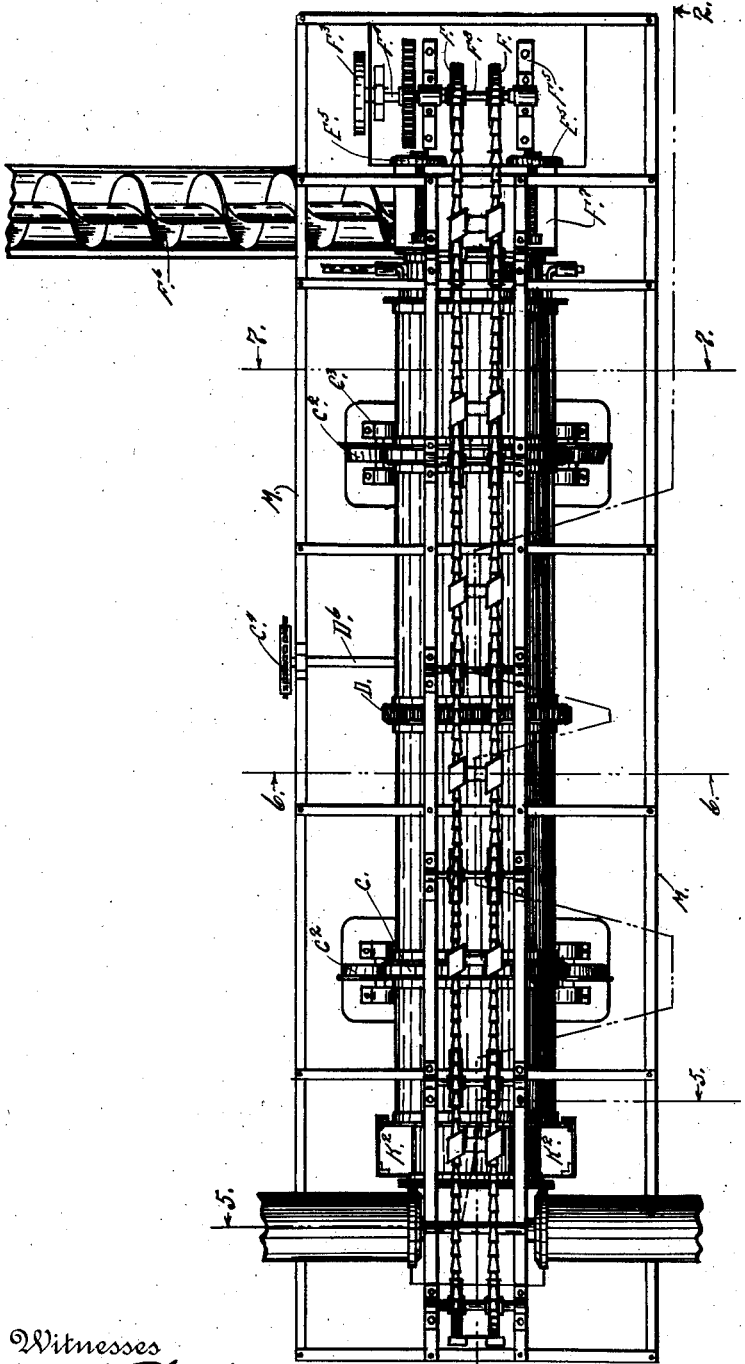

No. 830,435. PATENTED SEPT. 4, 1906.
R. C. HILLS.
REVOLVING DRIER.
APPLICATION FILED AUG. 8, 1905.

7 SHEETS—SHEET 1.

Witnesses
Burt L. Rhoads
Dena Nelson.

R. C. Hills.
Inventor
By
Attorney

No. 830,435. PATENTED SEPT. 4, 1906.
R. C. HILLS.
REVOLVING DRIER.
APPLICATION FILED AUG. 8, 1905.
7 SHEETS—SHEET 2.
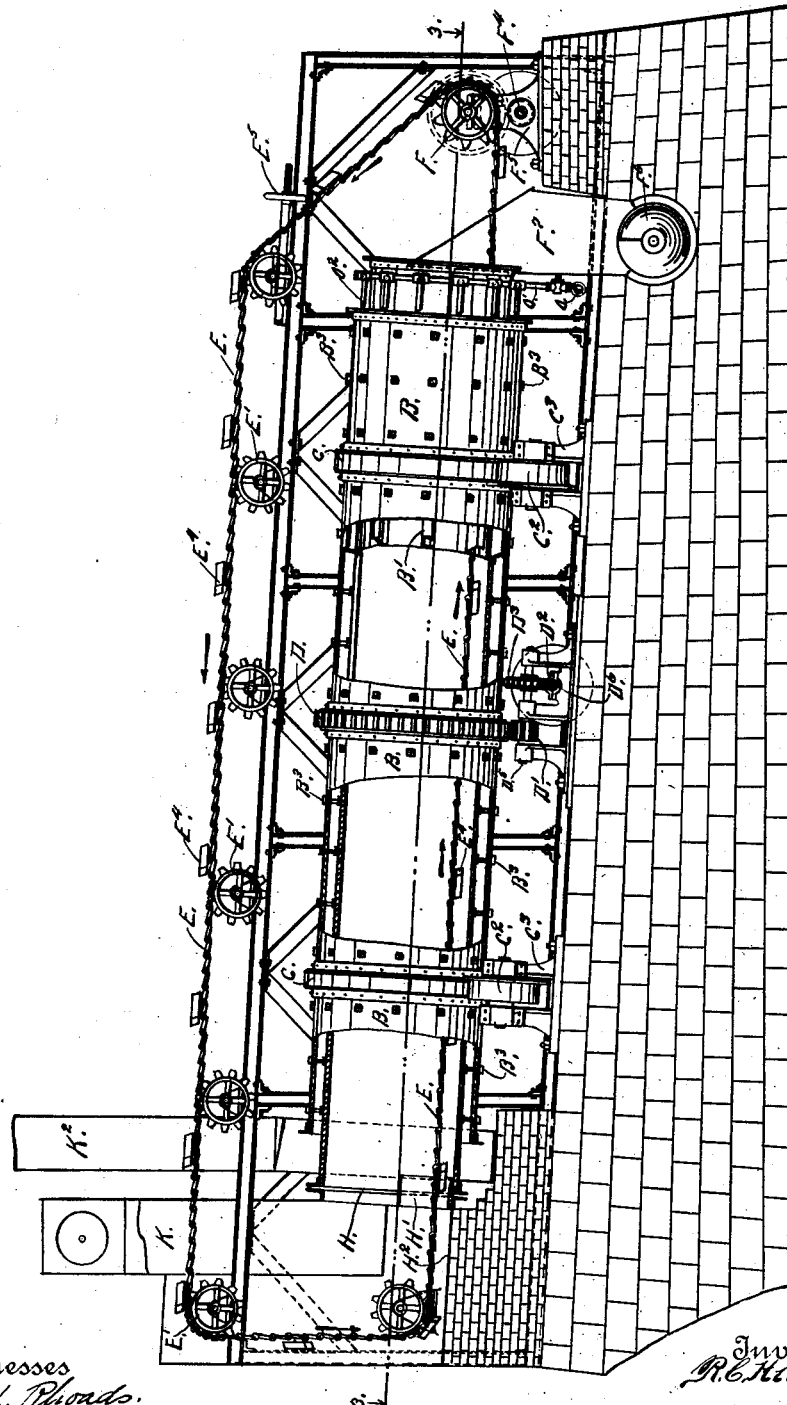

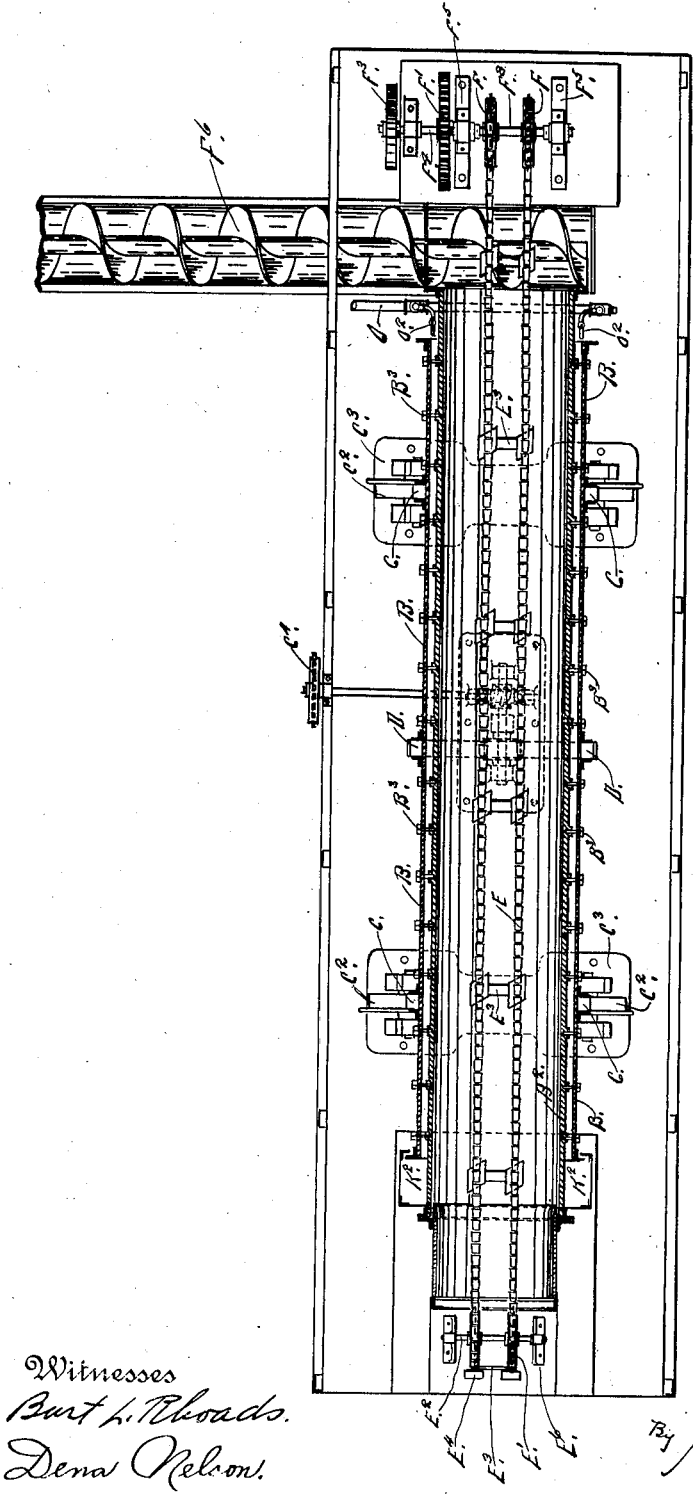

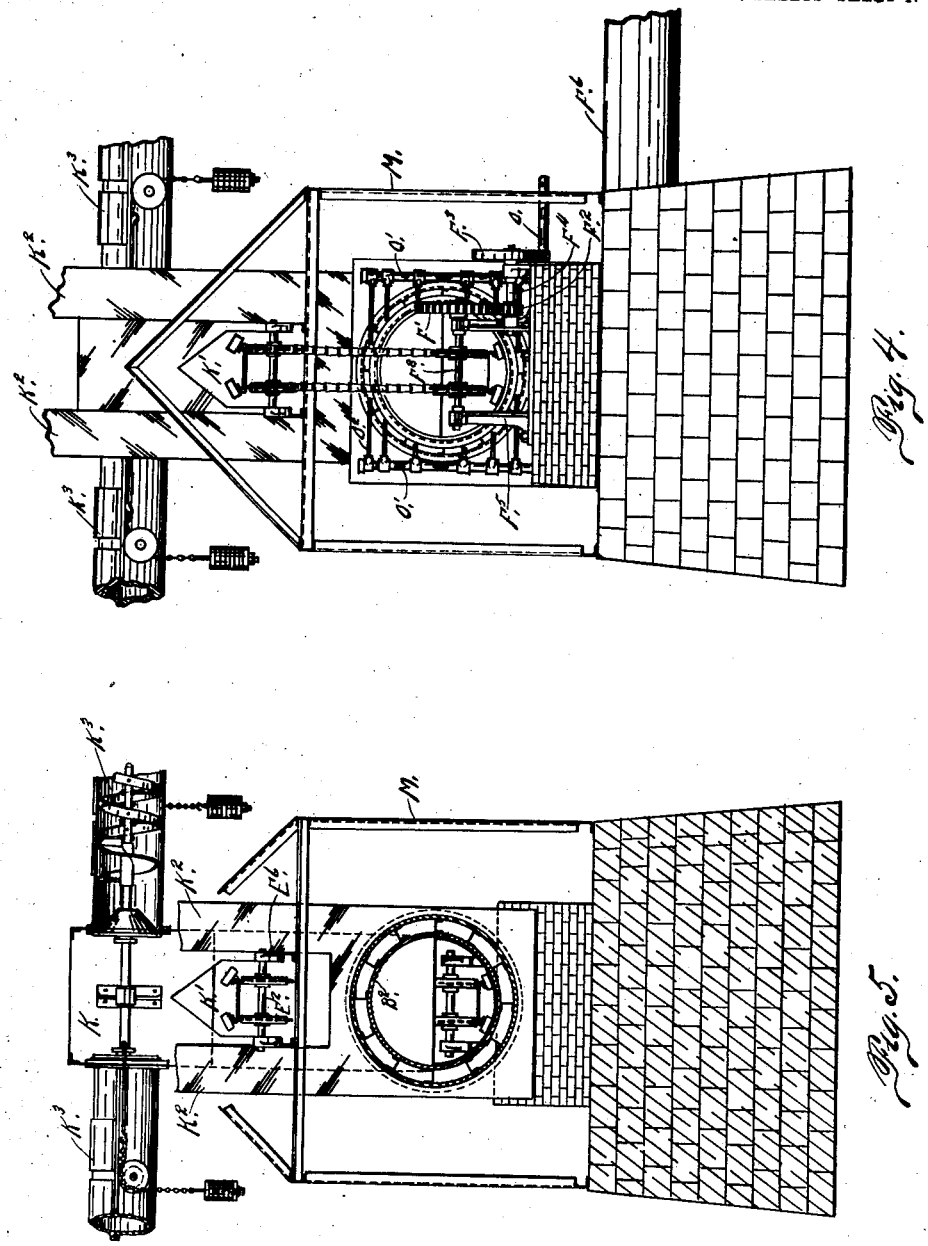

No. 830,435. PATENTED SEPT. 4, 1906.
R. C. HILLS.
REVOLVING DRIER.
APPLICATION FILED AUG. 8, 1905.

7 SHEETS—SHEET 5.

Witnesses
Burt L. Rhoads
Dena Nelson

R. C. Hills.
Inventor

By
Attorney

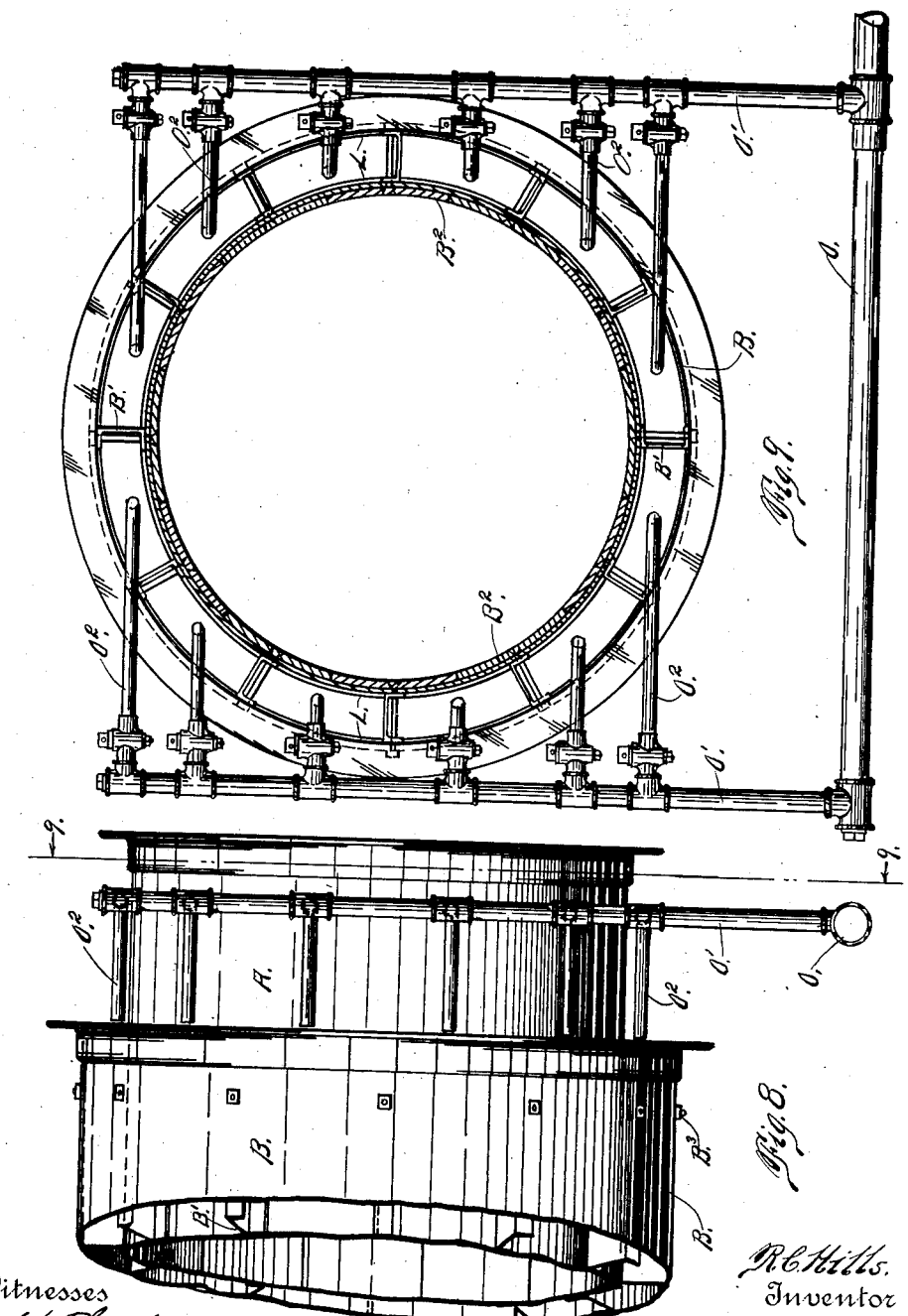

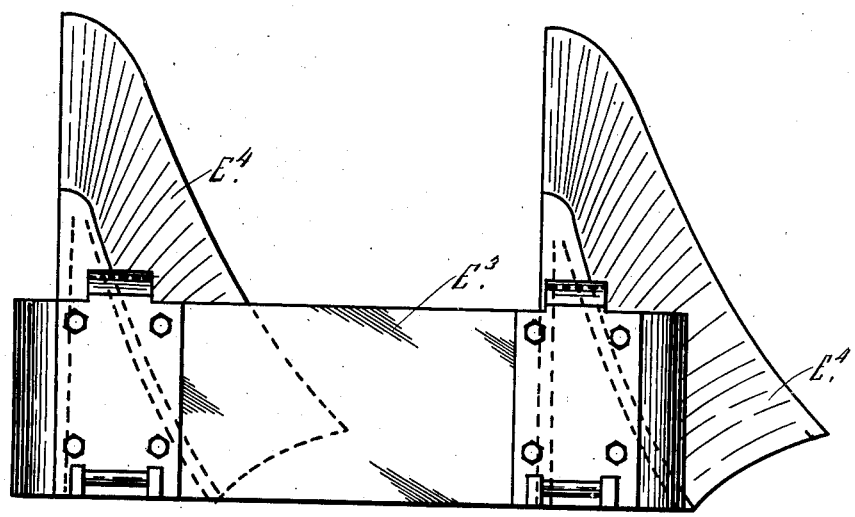
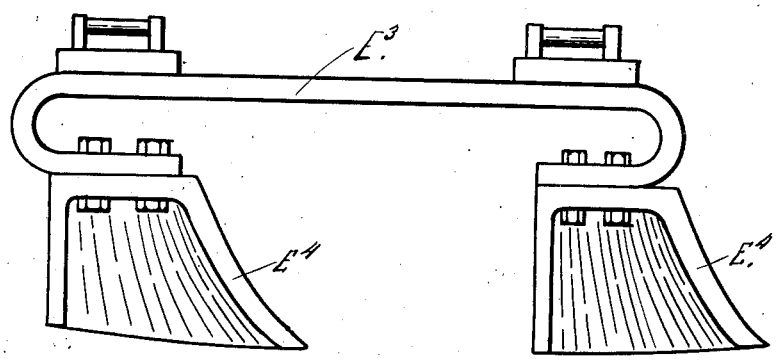

UNITED STATES PATENT OFFICE.

RICHARD C. HILLS, OF DENVER, COLORADO.

REVOLVING DRIER.

No. 830,435.     Specification of Letters Patent.     Patented Sept. 4, 1906.

Application filed August 8, 1905. Serial No. 273,220.

*To all whom it may concern:*

Be it known that I, RICHARD C. HILLS, a subject of the King of Great Britain, residing in the city and county of Denver and State of Colorado, have invented certain new and useful Improvements in Revolving Driers; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to improvements in revolving driers adapted for use in treating briquet material preparatory to passing the material to the briqueting machine or press where the briquets are manufactured. This is one of a number of machines through which the material is passed during the preparatory stage and takes the material from the mixing-scrubber covered by an application filed by me July 3, 1905, Serial No. 268,259.

The construction consists, generally speaking, of inner and outer concentric cylinders connected to rotate in unison. The outer cylinder in constructions of this class is usually termed a "mantle" and the heat necessary in the treatment of the material passing through the inner cylinder is generated, preferably, through the instrumentality of gas-burners, which deliver the necessary fuel-gas for purposes of combustion at one end of the revolving structure and into the space between the inner and outer cylinders. In my improved construction this space is divided into relatively narrow flues by means of longitudinally-disposed partitions consisting of channel-bars which form the connection between the two concentric cylindrical members.

An important feature of my improved construction consists of a sort of conveyer composed of endless flexible devices, as sprocket-chains, to which are connected plows or rabbles, which enter the inner cylinder at one end and pass out at the other end, the said plows or rabbles acting to facilitate the travel of the material through the machine and have a tendency to prevent the adhesive material under treatment from clinging to the inner surface of the cylinder. The revolving structure is downwardly inclined from the extremity which receives the material from the mixing-scrubber. As the cylinder revolves there is a constant tendency to cause the material to move forwardly therein. As the material is carried upwardly on one side of the cylinder and falls back it will be understood that after falling it occupies a position in advance to that originally occupied when in the lowest part of the cylinder. After the material has traveled through the cylinder it is taken out through the instrumentality of a screw conveyer and carried any desired distance for further treatment.

The material to be treated in this apparatus is an adhesive tarry substance, and the traveling plows or rabbles perform an important function in the treatment of the said material.

Having briefly outlined my improved construction, I will proceed to describe the same in detail, reference being made to the accompanying drawings, in which is illustrated an embodiment thereof.

Figure 6:
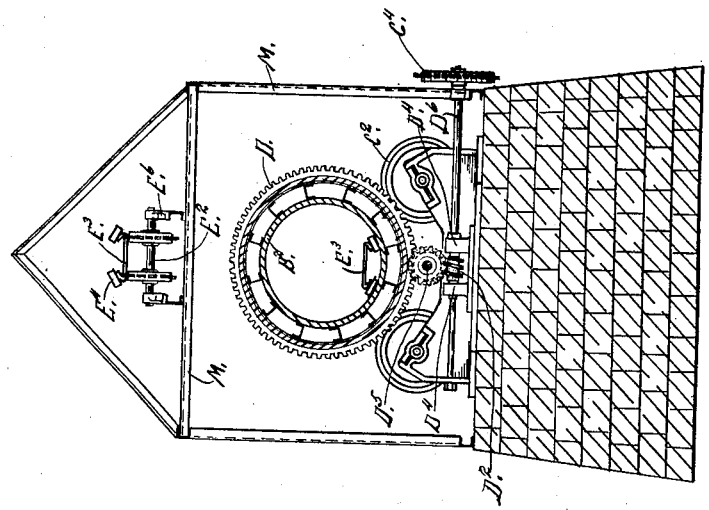
Figure 7:
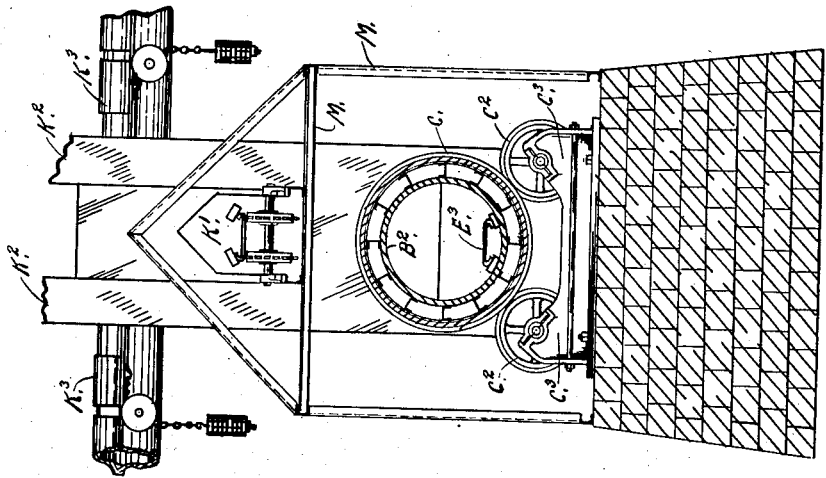

In the drawings, Figure 1 is a plan or top view of the machine. Fig. 2 is a side elevation, partly in section, along the line 2 2, Fig. 1. Fig. 3 is a horizontal section taken on the line 3 3, Fig. 2. Fig. 4 is an end elevation as seen from the front or discharge end of the machine. Figs. 5, 6, and 7 are cross-sections taken on the lines 5 5, 6 6, and 7 7, respectively, of Fig. 1. Fig. 8 is a fragmentary view showing the front end of the machine in side elevation and on a larger scale. Fig. 9 is a cross-section taken on the line 9 9, Fig. 8, viewed in the direction of the arrows. Fig. 10 is a top view showing one of the plows or scraper devices with which the sprocket-chains are equipped, the same being shown on a larger scale. Fig. 11 is an elevation of the same viewed in the direction of the arrow in Fig. 10.

The same reference characters indicate the same parts in all the views.

Let A designate the inner cylinder, B the outer cylinder or mantle, and B' channel-irons or bars supporting and stiffening the machine and dividing the space between the cylinder and mantle into longitudinal flues.

$B^2$ designates cast-iron wearing-plates countersunk for the heads of the bolts $B^3$, which pass to the outside of the mantle B.

C designates heavy guides constituting the bearings of the cylinders as they revolve on the flanged wheels $C^2$.

D is a cogged girdle or gear surrounding the mantle exteriorly and engaging a pinion D', which is actuated by a worm D² through the instrumentality of a worm-wheel D³, fast on the pinion-shaft D⁵.

D⁴ is a heavy bed-piece in which the shafts D⁵ and D⁶ are journaled. C³ designates similar pieces in which the shafts of the flanged wheel C² are journaled.

C⁴ is a sprocket-wheel connected with any suitable power for driving the worm D².

E represents sprocket-chains supported by sprocket-wheels E', which are provided with shafts E², revolving in bearings E⁶, mounted on the channel-bars of the frame M of the iron structure or housing covering the machine. To the chains E are attached spreaders E³, carrying the plows, scrapers, or rabbles E⁴.

E⁵ is an ordinary "take-up" or chain-tightener, whereby the tension of the endless chains of the conveyer may be regulated at will.

F represents driving-sprockets on a shaft F⁸, which is journaled in bearings F⁵ and is driven by a spur-wheel F', the latter being in turn actuated by a pinion F² and the pulley F³ on the shaft F⁴.

F⁶ is a screw conveyer entering a discharge-pocket F⁷, which receives the material from the forward or discharge end of the inner cylinder.

O is a small gas-main leading to upright pipes O', which distribute the gas to burners O².

L is a lining of asbestos cloth protecting the iron of the front part of the cylinder and mantle from the first contact of the gas-flame.

H is a stationary flanged frame against which the back end of the cylinder revolves. It supports a semicircular cast-iron lip H', projecting into the cylinder and over which the material is conveyed to the cylinder by the plows, scrapers, or rabbles of the endless conveyer. The apparatus is provided with a hood K, to which are attached the discharge ends of mixers K³. This hood is provided with an opening K⁴, extending through it for the passage of the traveling chains and plows or rabbles.

K² represents flues which carry off the products of combustion generated in the longitudinal flues between the cylinder and mantle.

H² is a floor located back of the rear extremity of the cylinder, to which the material is delivered from the mixers before passing to the drying-cylinder.

From the foregoing description the use and operation of my improved apparatus will be readily understood. In starting the machine the cylinder is made to revolve slowly on the flanged wheels C². Gas is turned on in the main O and pipes O' and ignited at the burners O². When the cylinder is sufficiently hot, the material, such as crushed coke mixed with crude tar, is delivered to the floor H² from the mixers K³, the chains E and their attached scrapers or rabbles E⁴ are put in motion, and the material carried forward by the scrapers is forced over the stationary semicircular casting H' into the cylinder. As the latter revolves the material is carried up on one side of the cylinder and, rolling back, advances over the hot inclined surface until it reaches the front end, when it falls into the pocket F⁷ and is carried away by the conveyer F⁶. Part of the material, however, as it rolls down from the upwardly-traveling side of the cylinder is carried forward by the scrapers, which perform the further function of removing any sticky material that may adhere to the wearing-plates.

Having thus described my invention, what I claim is—

1. In a revolving drier, the combination of a revoluble cylinder, means for supplying the cylinder with the necessary heat for drying purposes, and an endless traveling conveyer passing longitudinally through the cylinder.

2. The combination of an inner cylinder, an outer mantle connected with the cylinder to leave an intervening annular chamber, the two members being mounted to rotate in unison, means for supplying heat to the said chamber, and an endless traveling device passing through the inner cylinder and carrying plows, for the purpose set forth.

3. The combination of a rotary structure composed of inner and outer cylinders concentrically arranged and separated to form an annular chamber, means for supplying the chamber with heat for drying purposes, and an endless traveling device passing through the inner cylinder and carrying plows for the purpose set forth.

4. A drier comprising a longitudinally-inclined structure mounted to rotate and composed of inner and outer cylinders connected by longitudinally-disposed partitions to leave an annular chamber between them, means for supplying the said chamber with the necessary heat for drying purposes, the longitudinally-disposed partitions dividing the annular chamber into a series of distinct flues, and an endless traveling conveyer passing longitudinally through the inner cylinder for the purpose set forth.

5. A drier comprising a longitudinally-inclined structure mounted to rotate and composed of inner and outer cylinders connected to form an annular chamber between them, means for supplying the said chamber with the necessary heat, and an endless traveling device carrying plows, the same passing through the inner cylinder for the purpose set forth.

6. A drier composed of a longitudinally-inclined structure mounted to rotate and composed of inner and outer cylinders connected to leave an annular space between them, means for supplying the said space with the necessary heat for drying purposes, an endless traveling device carrying plows, passing through the inner cylinder, and means for delivering the material to be treated to the upper end of the cylinder.

7. A drier comprising a longitudinally-inclined structure mounted to rotate and composed of inner and outer cylinders connected to leave an annular chamber between them, and means for supplying the said chamber with the necessary heat for drying purposes at the lower extremity of the structure, a floor-space at the upper extremity of the structure, and an endless traveling device carrying scrapers, the same passing through the inner cylinder and arranged to carry the material from the floor-space into the cylinder, substantially as described.

8. A drier comprising a longitudinally-inclined structure mounted to rotate and composed of inner and outer cylinders connected to rotate in unison and arranged to leave an annular chamber between them, means for delivering the material to be treated to the upper extremity of the cylinder, means for introducing combustible fluid at the lower extremity of the structure, to the annular chamber, and an endless traveling device passing through the cylinder and carrying rabbles for the purpose set forth.

9. A drier comprising a longitudinally-inclined structure, mounted to rotate and composed of inner and outer cylinders connected to leave an annular chamber between them, means for introducing combustible fluid to the said chamber at the lower extremity of the structure, an endless traveling conveyer passing through the cylinder, a floor-space being formed at the upper extremity of the structure, a stationary lip between the floor-space and the cylinder, means for delivering the material to be treated to the said floor-space, the arrangement being such that the endless conveyer carries the material from the said floor-space over the said lip into the cylinder, substantially as described.

In testimony whereof I affix my signature in presence of two witnesses.

RICHARD C. HILLS.

Witnesses:
DENA NELSON,
A. J. O'BRIEN.